(12) United States Patent
Lamer

(10) Patent No.: US 10,135,244 B2
(45) Date of Patent: Nov. 20, 2018

(54) DECENTRALIZED SUPPLY OF POWER

(71) Applicant: ORANGE, Paris (FR)

(72) Inventor: Bastien Lamer, Meudon (FR)

(73) Assignee: Orange, Paris (FR)

( * ) Notice: Subject to any disclaimer, the term of this patent is extended or adjusted under 35 U.S.C. 154(b) by 263 days.

(21) Appl. No.: 14/781,020

(22) PCT Filed: Apr. 9, 2014

(86) PCT No.: PCT/FR2014/050851
§ 371 (c)(1),
(2) Date: Sep. 28, 2015

(87) PCT Pub. No.: WO2014/167246
PCT Pub. Date: Oct. 16, 2014

(65) Prior Publication Data
US 2016/0043551 A1    Feb. 11, 2016

(30) Foreign Application Priority Data

Apr. 9, 2013  (FR) ...................... 13 53190

(51) Int. Cl.
*H02J 3/00*   (2006.01)

(52) U.S. Cl.
CPC ............. *H02J 3/005* (2013.01); *H02J 3/008* (2013.01); *Y04S 50/10* (2013.01)

(58) Field of Classification Search
CPC ..................................................... H02J 3/005
See application file for complete search history.

(56) References Cited

U.S. PATENT DOCUMENTS 6,047,274 A * 4/2000 Johnson ................. G06Q 10/04
705/400
6,459,171 B1 * 10/2002 Leifer ....................... H02J 1/10
307/24

(Continued)

FOREIGN PATENT DOCUMENTS

CN    101 453 446 B    5/2012
EP    1 986 303 A1    10/2008

OTHER PUBLICATIONS

Google search engine definition of "telecommunications", https://www.google.com/search?q=define+telecommunications&rlz=1C1GCEA_enUS792US792&oq=define+telec&aqs=chrome.1.69i57j0l5.8253j0j8&sourceid=chrome&ie=UTF-8, accessed May 4, 2018.*

(Continued)

*Primary Examiner* — Thomas J Hiltunen
(74) *Attorney, Agent, or Firm* — Haverstock & Owens LLP

(57) ABSTRACT

The invention relates to the supplying power by means of a switching device (COM) connected to a plurality of facilities (A, B, C) by means of cables capable of transporting power ($Ie_A$, $Ie_B$, $Ie_C$). Said method comprises in particular the connection (120) of one of the cables ($Ie_A$), connected to one of said facilities (A), referred to as the requesting facility, to at least another one of the cables ($Ie_B$, $Ie_C$), connected to at least another one of said facilities (B, C), referred to as supply facilities, by means of the switching device, in accordance with at least one negotiation message consistent with a telecommunications signalling protocol, exchanged between energy-management device ($EGE_A$, $EGE_B$) installed in said demand and supply facilities. Following said connection, an amount of power is transported (130)

(Continued)

from the at least one supply facility to the requesting facility, via the cables connected by means of the switching device.

14 Claims, 2 Drawing Sheets

(56) References Cited

U.S. PATENT DOCUMENTS

| | | | | |
|---|---|---|---|---|
| 6,680,547 | B1* | 1/2004 | Dailey | H02J 3/28 |
| | | | | 307/24 |
| 8,140,194 | B2* | 3/2012 | Iino | H02J 3/14 |
| | | | | 700/295 |
| 8,626,319 | B2* | 1/2014 | Weatherhead | G06Q 50/06 |
| | | | | 700/22 |
| 9,256,905 | B2* | 2/2016 | Mashinsky | G06Q 40/04 |
| 9,685,819 | B2* | 6/2017 | Frampton | H02J 9/061 |
| 2006/0259200 | A1* | 11/2006 | Choi | H02J 3/005 |
| | | | | 700/287 |
| 2013/0245850 | A1* | 9/2013 | Okayama | G06F 1/26 |
| | | | | 700/295 |
| 2015/0162783 | A1* | 6/2015 | Kanayama | H01H 63/36 |
| | | | | 307/66 |
| 2016/0091912 | A1* | 3/2016 | Stanlake | G05F 1/66 |
| | | | | 700/295 |
| 2016/0181803 | A1* | 6/2016 | Krishnamurthy | H02J 1/10 |
| | | | | 307/31 |
| 2016/0276859 | A1* | 9/2016 | Kudo | H02J 3/32 |

OTHER PUBLICATIONS

The Written Opinion from PCT/FR2014/050851.
International Search Report from PCT/FR2014/050851.

* cited by examiner

DECENTRALIZED SUPPLY OF POWER

The present invention relates to the field of electrical energy distribution between terminal installations, and in particular electrical energy distribution in a decentralized context, by reusing negotiation mechanisms specific to telecommunications resources.

The transport of electrical energy and the transmission of data customarily use two distinct networks whose architectures, which are highly hierarchized, differ substantially.

On the one hand, the transport network of an electrical energy supplier makes it possible to deliver this electrical energy to a termination point, whether this be a device or a residence, from a production center (e.g. electrical substation), when called for by the termination point.

This type of system is naturally prone to energy shortfalls ("blackouts"), since the electrical energy is delivered thereto without admission control. Furthermore, such a transport network is centralized and does not allow the exchange of energy locally and directly between the termination points, whereas these latter may very well themselves be electrical energy producers (such is the case for example for buildings having renewable energy means or a bank of electrical batteries). More and more new-build constructions of this type are said to be energy positive, that is to say that on average they produce more energy (electricity, heat) than they consume.

On the telecommunications networks side, remote power feed systems exist in which terminal devices are electrically powered through a telecommunications network. However, these systems turn out to be relatively static and do not allow negotiation of supply of electrical energy between termination points of the telecommunications network, nor a fortiori the transport of electrical energy between termination points which have come to a mutual agreement on the term of such a negotiation.

The present invention is therefore aimed at addressing the drawbacks of the prior art and proposes for this purpose a method of supply of electrical energy by means of a switching device connected to a plurality of installations by way of cables able to transport electrical energy, the method comprising the following steps:

connecting one of the cables, connected to one of the installations termed a demander, to at least one other of the cables, connected to another of the installations termed a supplier, by means of the switching device, as a function of at least one negotiation message, in accordance with a telecommunications signaling protocol, exchanged between energy manager devices installed in the demander and supplier installations; and transporting a quantity of electrical energy, from the at least one supplier installation to the demander installation, by way of the cables connected in by means of the switching device.

It is thus possible to control the routing of electrical energy to be delivered, directly between several installations, as a function of a negotiation between these installations and to transport this energy between these installations, in a local and decentralized manner. This routing can be automated and implemented in a simple manner, without substantial modification at the level of the electrical distribution network, by reusing a signaling protocol already existing on the telecommunications network.

According to one embodiment in which the negotiation message is a response message of said at least one supplier installation to an electricity supply request emanating from the demander installation, the method furthermore comprises the interception, in a control module, of the response message and, when this response message is positive, the triggering of the connection of the cables connected to the demander installation and the supplier installation.

This allows a third party operator to control the decentralized routing of the electrical energy to be delivered, while taking account by priority of its own constraints, as well as optionally of the constraints of the partner operator of the electrical distribution network supporting this routing, with respect to the constraints of the end user of the demander installation, on the basis of the information transmitted in the responses originating from the installations that are able to supply electrical energy. The third party operator can then refuse the switching if it considers that the demand in terms of electrical energy is too large for the local network to be able to transmit it, such as a system administrator.

In one embodiment where this control module is situated in a telecommunications network, the method furthermore comprises, subsequent to the interception of the response message and when the response message is positive, the dispatching by the signaling control device of a request for switching to the switching device so as to trigger the connection of the cables connected to the demander installation and the supplier installation. Thus, the operator of the telecommunications network on which the delivery of electrical energy is negotiated can control the routing of the electrical energy, while taking account by priority of its own constraints as well as optionally of the constraints of the partner operator of the electrical distribution network supporting this routing, with respect to the constraints of the user of the demander installation. Furthermore, the control of the switch can be performed in a secure manner, by virtue of a device installed in the telecommunications network, to guard against potential "hacking" of the switch.

In another embodiment where the control module and the switching device are integrated into a connection device, the method furthermore comprises, subsequent to the interception of the response message and when said response message is positive, the control of the switching device by the control module as a function of the positive response message, so as to trigger the connection of the cables connected to the demander installation and the supplier installation. This makes it possible to fully manage the routing of electricity at the level of a connection device, advantageously situated in proximity to the installations, without introducing additional signaling into the telecommunications network.

According to another embodiment where the negotiation message is a switching request, issued by the electrical manager device of the demander installation after having received a positive response message of at least one supplier installation to an electricity supply request of the demander installation, the method comprises the dispatching of the switching request, from the demander installation to the switching device, so as to trigger the connection of the cables connected to the demander installation and the supplier installation. Here, the connection between two demander and supplier installations is done only on completion of the negotiation between these two installations, and on order of the demander installation, which can therefore favor by priority its own constraints in terms of timeslot and tariff plan. This therefore allows completely decentralized and open management of the supplying of electrical energy between terminal users.

Furthermore, according to another advantageous characteristic, the telecommunications signaling protocol is the SIP protocol. This SIP protocol is indeed designed for the negotiation of transmission resources between terminals and proposes a whole palette of messages which is suitable for this type of negotiation, it can easily be re-employed to trigger the switching of electrical transport cables within the framework of the negotiation of energy resources.

The present invention furthermore proposes a connection device able to be connected to a plurality of cables, respectively able to transport electrical energy to an installation, comprising a switch connected to the cables, this switch being configured to connect the cables, connected to a so-called demander installation, to at least one other of the cables, connected to at least one so-called supplier installation, as a function of at least one negotiation message, in accordance with a telecommunications signaling protocol, exchanged between energy manager devices installed in said demander and supplier installations. Such a device allows the decentralized routing of electrical energy to be delivered, directly between several installations, as a function of a negotiation put in place between these installations.

According to an advantageous characteristic, the connection device furthermore comprises a communication interface able to receive a switching request, generated as a function of the negotiation message, and configured to control the switch as a function of this switching request so as to connect the cables connected to the demander and supplier installations. It is thus possible to remotely control the decentralized routing of the electrical energy to be delivered between installations, this being particularly suitable for a context where the electrical distribution network is distinct from the telecommunications network on which the negotiation between installations takes place.

According to an advantageous characteristic, the connection device furthermore comprises a control module able to intercept the at least one negotiation message and configured to control the switch as a function of the negotiation message so as to connect the cables connected to the demander and supplier installations. It is thus possible to control directly, at the level of the connection device itself, the decentralized routing of the electrical energy to be delivered between installations, this being particularly suitable for a context where the electrical distribution network is merged with the telecommunications network on which the negotiation between installations takes place.

The present invention furthermore proposes an electrical energy delivery system comprising:

a plurality of installations comprising a, so-called demander, installation, and at least one other, so-called supplier, installation, these installations each comprising an energy manager device, able to exchange at least one electrical energy negotiation message with another energy manager device; and a connection device such as described hereinabove, connected respectively to each of the installations by way of cables able to transport electrical energy.

According to an advantageous characteristic, the delivery system furthermore comprises a plurality of transmission lines respectively connecting the energy manager devices to a signaling control device configured to manage the exchange of signaling messages between the energy manager devices. Such a system makes it possible to use a local loop of a telecommunications network to locally implement the negotiation of electrical resources culminating in the control of the routing of the decentralized delivery of electrical energy.

In one embodiment, the cables able to transport electrical energy are transmission lines paired in a telecommunications network with the transmission lines connecting the energy manager devices to the signaling control device. It is thus possible to use a multi-line local loop of a telecommunications network both for the negotiation of the electrical energy to be delivered locally and for its transport, and to do so in a completely decentralized manner, while dissociating the lines dedicated to negotiation from the lines dedicated to actual transport so as to partition these functionalities. This makes it possible in particular to reassign to the transport of electricity already installed local loops of a telecommunications network that have become unnecessary for example subsequent to the deployment of an FTTH fiber optic network.

In another embodiment, the cables able to transport electrical energy are furthermore able to transmit said at least one negotiation message between the energy manager devices of said demander and supplier installations. It is thus possible to use a single-line local loop of a telecommunications or electrical distribution network both for the negotiation of the electrical energy to be delivered locally and for its actual transport, doing so in a completely decentralized manner.

According to a particular characteristic of the latter embodiment, the cables, able to transport electrical energy and to transmit said at least one negotiation message, are transmission lines of a telecommunications network. This makes it possible to use a local loop of a telecommunications network and in particular to reassign to the transport of electricity already installed local loops of a telecommunications network that have become unnecessary for example subsequent to the deployment of an FTTH fiber optic network.

Other characteristics and advantages of the invention will become apparent on reading, in the description detailed hereinafter, particular embodiments given by way of non-limiting examples and the appended figures in which.

Figure 3:
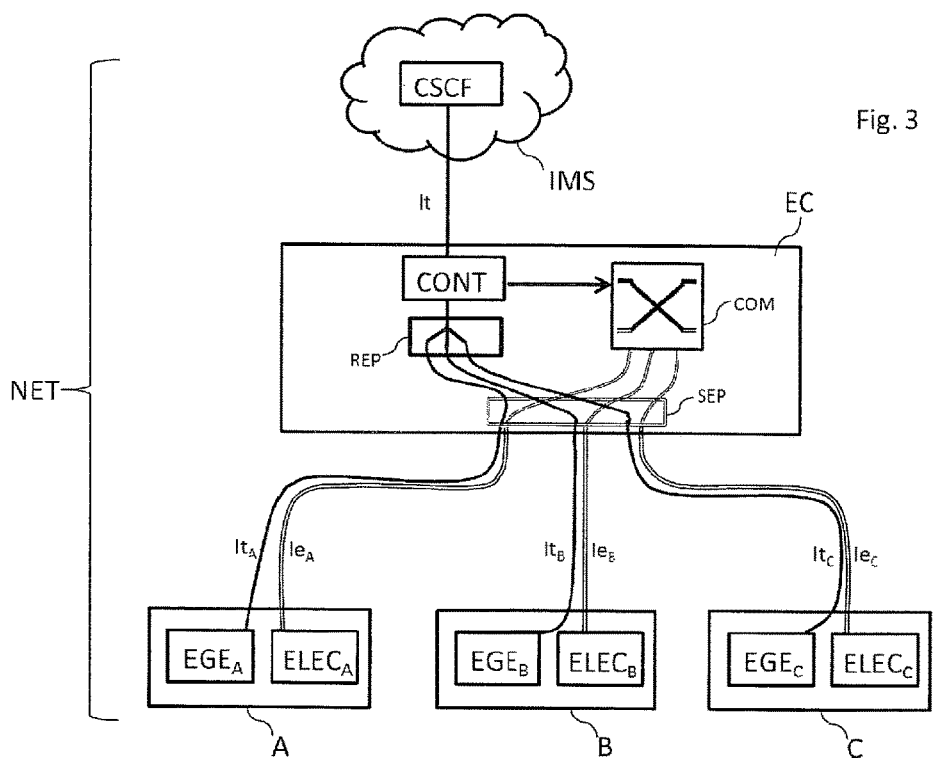
Figure 4:
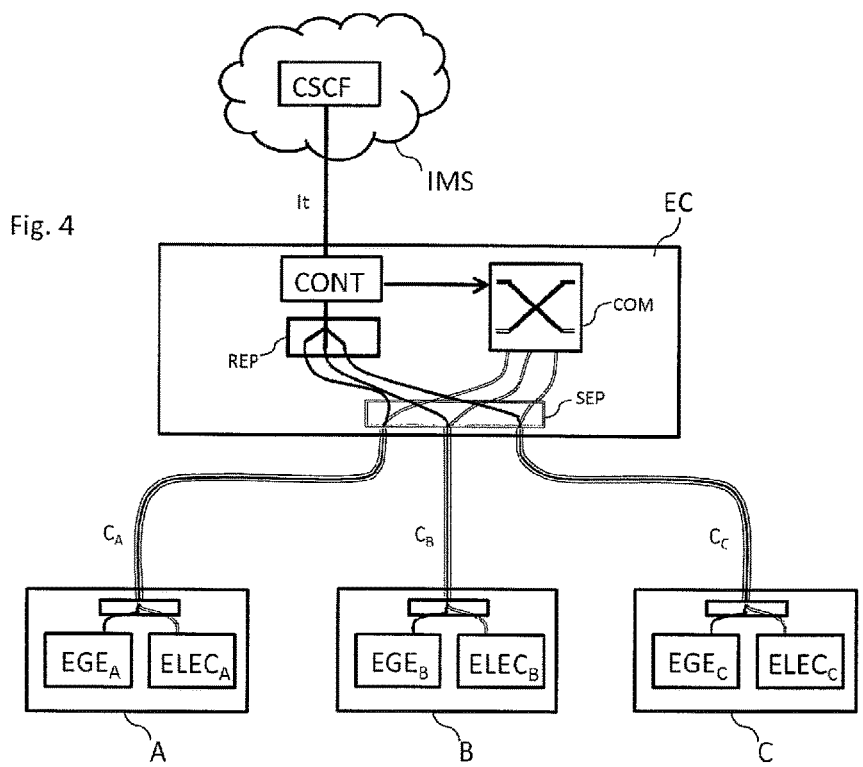

FIG. 3 illustrates a system for negotiated delivery of electrical energy according to a second embodiment of the invention, in which a telecommunications network is either used for the negotiation of electrical resources between installations or for actual electrical energy delivery; and FIG. 4 illustrates an alternative system for negotiated delivery of electrical energy according to the second embodiment of the invention in which a telecommunications network is either used for the negotiation of electrical resources between installations or for actual electrical energy delivery.

Figure 1:
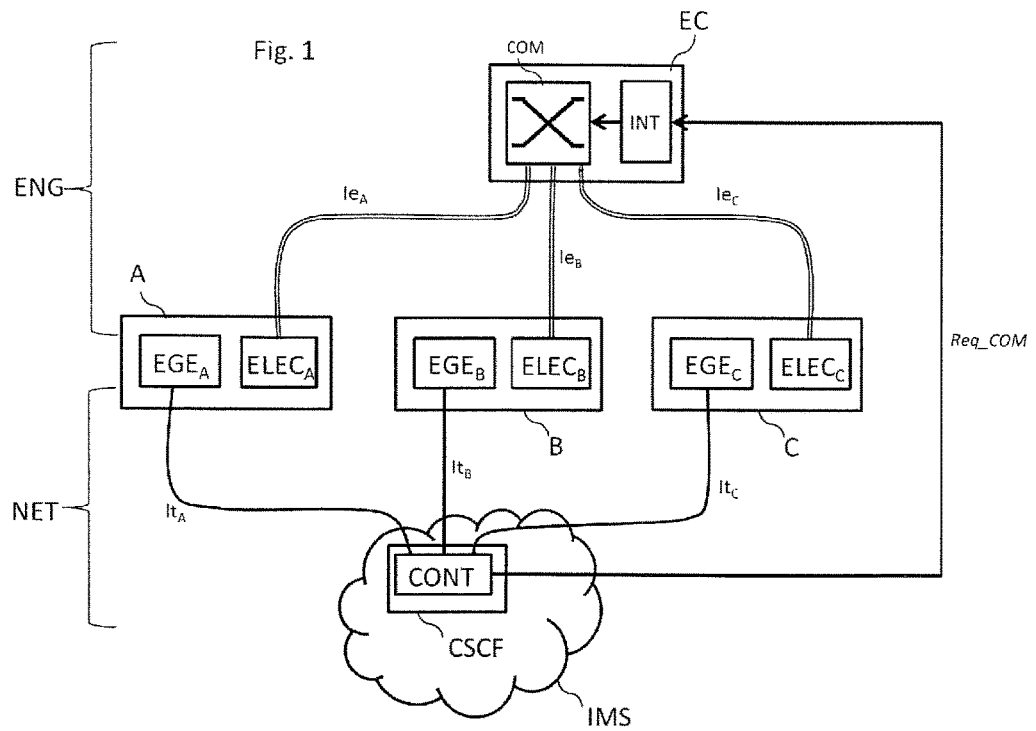
FIG. 1 illustrates an electrical energy delivery system according to a first embodiment of the invention, in which distinct telecommunications and electrical distribution networks are employed jointly for the decentralized supply of electricity.

FIG. 1 is referred to first, and illustrates an electrical energy delivery system according to a first embodiment of the invention, in which distinct telecommunications and electrical distribution networks are employed jointly for the decentralized supply of electricity.

This system comprises on the one hand a certain number of installations that may supply or demand electrical energy. Three installations A, B and C are illustrated in FIG. 1, the invention being applicable, however, to an arbitrary number of installations. These installations can in particular be private residences, offices or properties.

Each installation comprises an electrical system ($ELEC_A$ for installation A, etc.) which behaves either as an electrical energy source, or as an electrical energy consumer entity. Thus, among these installations, some may have an electrical system comprising autonomous means of electrical energy generation (such as for example solar panels, wind turbines or the like) and electrical energy storage means (such as for example an electrical battery bank). These installations are designated here as being "electrical energy suppliers", since they can supply all or part of the electricity that they generate to the electricity transport network. Other installations may, on the contrary, have an electrical system requiring the delivery of electrical energy, so as to power certain electricity-consuming devices. Such installations are designated here as being "electrical energy demanders". One and the same installation may be an electrical energy supplier or demander, as a function of its generating capacities compared with its intrinsic consumption at a given instant.

Furthermore, within each installation is an energy manager device (designated by $EGE_A$ for installation A, etc.) serving in particular to negotiate, with the energy manager devices of one or more other installations, electrical energy resources as well as the conditions of their supply, as will be seen further on. This energy manager device $EGE_A$ can typically take the form of a domestic telecommunications gateway, modified (for example by means of the installation of a complementary software module) to allow the negotiation of electrical resources. Alternatively, this energy manager device can be implemented in the form of a home-automation gateway ("home automation box") or else take the form of an independent module communicating or otherwise with such gateways.

The installations A,B,C are linked, on the one hand, to a connection device EC within an electrical energy distribution network ENG, by way of electrical energy transport cables (here typically low-voltage cables, but also optionally telecoms copper pairs as will be seen further on) designated respectively by $Ie_A$, $Ie_B$ and $Ie_C$. This connection device EC can in particular be a point of concentration of a local loop of an electrical distribution network, which enables the installations A,B,C to be powered on the basis of medium voltage (40 kV) electricity delivered by the transport network of an electricity supplier. The device EC can also be a point of concentration of a local telecoms loop, which enables the remote powering of devices located in the local loop or at the client's premises.

The installations A,B,C are moreover connected together in a telecommunications network NET, by means of their respective energy manager devices $EGE_A$, $EGE_B$ and $EGE_C$ which can communicate with one another by way of the transmission lines $It_A$, $It_B$ and $It_C$ connected to a signaling control device, designated by CSCF and situated in a core part of the network NET, managing the exchange of signaling messages between these energy manager devices, these messages being in accordance with a signaling protocol supported by the telecommunications network NET and allowing the negotiation of electrical energy supply. The energy exchanges between supplier and demander can stem from the following (non-exhaustive) procedures:

1—The demander installation subscribes to a type of energy (sum total, slot, tariff for example) with a server attached to the device CSCF (of RLS (Resource List Server) type by analogy with the presence architecture) which receives the suppliers' proposals (excess energy for example) and notifies the demander once the energy is available. There follows a negotiation with the supplier so as to be certain that the energy is always available.

2—The demander installation retrieves a list of suppliers close to its residence from the server on which the suppliers have registered and addresses a request to each supplier as a function of its energy need, each addressed supplier responds as a function of its availabilities 3—The demander installation dispatches a request relating to its energy need to the server which has the list of suppliers to be addressed (depending for example on their address and their capacity to respond) and therefore relays via the device CSCF the demand to the appropriate suppliers which respond as a function of their availability 4—The installation of the supplier posts on a server the type of energy that it desires to make available to demanders (sum total in Watts, slot, tariff for example). In this case the demander installation dispatches its request to the server only, via the CSCF and then negotiates with the supplier(s) of its choice.

This signaling control device CSCF comprises in particular a control module CONT capable of intercepting the signaling messages exchanged between the energy manager devices and of extracting therefrom the information related to the negotiation of electrical resources, so as to analyze it and to deduce therefrom a switching request req_COM intended to remotely trigger the connection of a supplier installation with a demander installation as a function of this negotiation. This signaling control device can in particular be a P-CSCF ("Proxy-Call Server Control Function") module installed within an IMS network core of the telecommunications network NET, the messages exchanged between the energy manager devices of the installations A,B,C then complying with the SIP protocol customarily used in this type of network. The P-CSCF module can thus, subsequent to the interception of the signaling (and the extraction of useful data such as the result of the negotiation, the identities of the demander/supplier, the characteristics of the energy to be exchanged) consult a database so as to establish the hookup rules for the energy manager devices. This database, that may be named PCRF (Policy Control Resource Function), by analogy with the function found in the IMS, can hold information of the type "geographical coordinates of the module EC", "type of cables to be hooked up between the energy manager devices, depending on the energy to be transmitted", "identifiers of the physical ports of the switch to be hooked up", "duration of hookup", or any other information useful to the establishment of the request req_COM. The control module CONT can take the form of a program comprising code instructions and installed within the signaling control device CSCF, which then has a memory for storing these code instructions and a processor for executing such a program.

The connection device EC comprises, on the one hand, a communication interface INT capable of receiving the aforementioned switching request req_COM, such as generated by the control module CONT when the latter detects that a supplier installation responds positively to a request of a demander installation. This communication interface INT can be a radio interface, allowing the exchanging of messages with the control module or the manager devices by way of a wireless network, or else a wired interface linked to the control module CONT by way of the network NET. The communication between the module CONT in the network NET and the communication interface INT can be made secure by means of a certificate, or indeed of an encryption of data, so as to prevent a malicious third party from seizing hold of the switching orders and the identifiers of the cables to be connected, within the request req_COM, so as to divert their use.

The connection device comprises, on the other hand, a switch COM able to connect together certain of the transport cables $Ie_A$, $Ie_B$ and $Ie_C$, and controlled, via the communication interface INT, as a function of the reception of such a request req_COM and of its content. In particular, if this request req_COM contains the identifiers of cables connected to a supplier installation and to a demander installation (or of physical ports of the switch), as well as an indication that these cables must be connected, the switch COM interprets such a request as an order for connecting the cables identified in this request.

Figure 2:
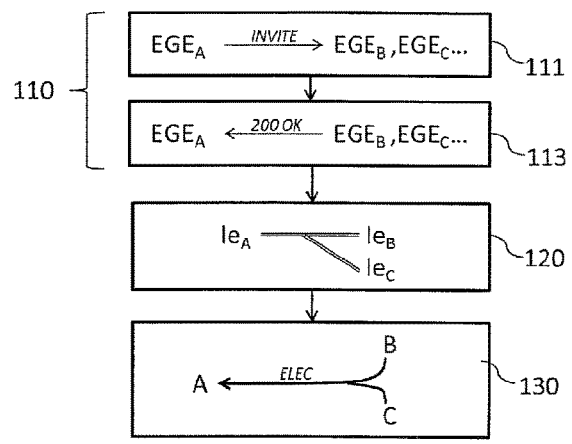
FIG. 2 illustrates the steps of a method of supply of electrical energy according to an embodiment of the present invention.

FIG. 2, which illustrates the steps of a method of supply of electrical energy according to an embodiment of the present invention, is now referred to.

This method begins with a negotiation between installations (negotiation step 110) in the course of which, within the telecommunications network NET such as described in FIG. 1, a so-called "electrical energy demander" installation negotiates with one or more so-called "electrical energy supplier" installations a certain quantity of electrical energy to be supplied. As indicated previously, this negotiation of electrical resources is carried out by means of the exchanging of negotiation messages between the energy manager devices of the various installations, transmitted on the transmission lines dedicated to the transmission of information (e.g. the lines $It_A$ to $It_C$ in FIG. 1). Such messages comply with a signaling protocol customarily used to negotiate transmission capacity resources (typically the SIP protocol) and suitable for introducing thereinto information relating to electrical energy resources.

Thus, in the case where the installation A is an electrical energy demander installation and uses the SIP protocol, the energy manager device $EGE_A$ formulates a message of "INVITE" type and dispatches it to the energy manager devices of a certain number of electrical energy supplier installations, so as to notify its need for a certain quantity of electrical energy. This "INVITE" message can thus contain a specific field, inserted into the body of this message formulated according to the SDP protocol, into which is inserted an item of information as regards the quantity of electrical energy desired (for example 50 W) by the demander installation A.

In addition to this item of information relating to the quantity of electricity desired, this specific field can contain other information relating to the electricity delivery conditions desired by the demander installation A, such as for example:
- a timeslot in which the demander installation A desires to obtain this quantity (for example between 19.// and 22.//),
- a voltage at which the demander installation A desires to receive this electrical energy (e.g. the maximum voltage supported by the electrical system $ELEC_A$ and/or the cable $Ie_A$ of the installation A)
- a maximum tariff defined by the installation A for the delivery of the desired quantity of electrical energy.

An "INVITE" request message such as described hereinabove is thus dispatched to one or more other energy manager devices (step 111), situated in installations considered to be electrical energy suppliers, therefore to be potentially able to supply this type of energy, for example installations B and C of FIG. 1.

The addresses (e.g. IP addresses) of the energy manager devices $EGE_B$ and $EGE_C$ that are the recipients of this "INVITE" request are typically logged in a list of contacts stored in the device $EGE_A$, so as to be used to dispatch these "SIP INVITE" messages automatically. Alternatively, the user of the installation A can use an interface of this device $EGE_A$ to launch the negotiation and the dispatching of the "SIP INVITE" messages, so as for example to reserve a certain quantity of electrical energy for subsequent use. The device $EGE_A$ can thus store a database comprising a list of contacts with the addresses of the electrical energy supplier installations, the tariffs implemented by these installations to deliver electricity (received for example in response to a previous request or in an update message), the energy actually consumed originating from each of these supplier installations and the tariffs actually applied, as well as the quantity of electrical energy reserved with each of the supplier installations for subsequent use.

This "INVITE" request travels through the transmission line $It_A$ to the signaling control device CSCF of the network NET, which redirects it toward the recipient electricity-manager devices $EGE_B$ and $EGE_C$, via the transmission lines $It_B$ and $It_C$, after having optionally undertaken the authentication of the manager device $EGE_A$ and verified its rights to the decentralized electrical energy supply service.

Once this "INVITE" request has been received, the device $EGE_B$ can respond thereto, either negatively by dispatching an SIP response message of type 606 ("Not acceptable"), optionally associated with a warning code (of type 370, "insufficient bandwidth"), allowing for example $EGE_A$ to renegotiate with $EGE_B$ a lower sum total of energy, or positively (if the installation B actually has a quantity of electricity to be supplied under delivery conditions compatible with the delivery constraints indicated in the "INVITE" request) by returning (step 113) to the device $EGE_A$ an SIP response message of type "200 OK" containing a specific field into which is inserted, on the one hand, the quantity of electrical energy that installation B can actually supply (for example 30 W, with respect to the 50 W demanded), as well as other information relating to the energy delivery conditions proposed by installation B, such as the timeslot during which this delivery is proposed (for example 19.//-20.//).

A positive response message "200 OK" such as this is then routed to the device $EGE_A$, by way of the transmission line $It_B$, of the signaling control device CSCF and of the transmission line $It_A$. The same exchange of "INVITE" request and of response "200 OK" takes place separately between the manager $EGE_A$ and $EGE_C$.

The exchange of "INVITE" request messages and of response messages "200 OK" can thus allow the device $EGE_A$ to gather information relating to the energy delivery conditions offered by various supplier installations and to compare same, so as for example to choose, between several installations that are able to offer the desired quantity of electrical energy, the one implementing the least expensive tariff or offering to deliver this energy in the timeslot most compatible with the timeslot desired for the installation A.

This exchange of negotiation messages can be repeated with various electrical energy supplier installations until the demander installation A obtains the desired quantity of electrical energy. In the present example, after having obtained a first response "200 OK" proposing the supply of 30 W by the installation B, the negotiation can continue with the dispatching to the energy manager device $EGE_C$ of a second "INVITE" message requesting the delivery of the missing 20 W and terminate with the reception of a second positive response "200 OK", originating from the manager device $EGE_C$ and indicating to the device $EGE_A$ that installation C is ready to deliver 20 W to it under the conditions that it desires.

In one embodiment, the control module CONT intercepts the request messages issued by the manager device $EGE_A$, as well as the response messages issued by the manager devices $EGE_B$ and $EGE_C$, and stores them in a database, so as to keep track of the negotiations in progress between these installations.

When it intercepts the positive message "200 OK" transmitted by the device $EGE_B$, the control module CONT deduces therefrom that it is necessary to connect, at the level of the electricity transport network, the installation A with the installation B, and thus constructs the switching request req_COM intended for the switch COM of the connection device EC connecting these two installations. This request req_COM can take the form of a message in which are identified the two electricity transport cables serving these installations A and B (i.e. the cables $Ie_A$ and $Ie_B$), in association with an order of connection of these cables (or of the physical ports of the switch), interpretable by the switch COM. This request req_COM is then transmitted to the connection device EC, where it is received by the switching interface INT so as to cause the connection of the cables $Ie_A$ and $Ie_B$ by the switch COM. A similar operation can be performed subsequently when the control module CONT intercepts the second positive response "200 OK" issued by the manager device $EGE_C$, so that the switching of the cables, at the level of the connection device EC, is done as dictated by the successive positive responses originating from the supplier installations, without intervention on the part of the manager device $EGE_A$. Thus, in this embodiment, it is the agreement of a supplier installation which is favored, with respect to the desires of the demander installation, in the switching decision process. The demander installation may then have to ensure non-overlapping of the slots for energy transfer by several supplier installations, in the case where the switch could not connect its installation in to several suppliers at a time.

In an alternative embodiment, the positive responses "200 OK" of the manager devices $EGE_B$ and $EGE_C$ are transmitted to the manager device $EGE_A$ without the control module CONT giving the switch COM any order. The manager device $EGE_A$ then uses the information transmitted in the responses "200 OK" to accept one of the offers (or indeed both offers), or optionally return a new "INVITE" request to continue the negotiation with other conditions. If the manager device $EGE_A$ accepts at least one of the offers received (for example the offer of delivery of 30 W issued by the manager device $EGE_B$), this device $EGE_A$ constructs the switching request req_COM intended for the switch COM of the connection device EC connecting the installation A to this installation B, in the manner previously described, and dispatches this switching request to this connection device EC, where it is received and processed by the switching interface INT. Thus, in this alternative embodiment, it is the final agreement of the demander installation which is favored, with respect to the initial offers of the supplier installations such as transmitted in the positive response messages issued by the latter, in the switching decision process.

In addition to the "INVITE" and "200 OK" messages, other messages in accordance with the SIP protocol can be employed within the framework of this negotiation phase. Thus, the electrical manager device $EGE_A$ can dispatch a "SUBSCRIBE/NOTIFY" message to the device $EGE_B$, or to a server of RLS type which would receive the offers of the suppliers via a "PUBLISH" message, so as to be advised of the actual availability of a quantity of electricity. An "UPDATE" message can also be dispatched, from the device $EGE_B$ to the device $EGE_A$ (or the server RLS) so as to inform the latter of a modification of an electricity delivery parameter of the installation B, for example of a change of tariff or of delivery timeslot, thereby allowing the device $EGE_A$ (or the server RLS) to update this parameter in its database.

When a switching request req_COM, issued either by the control module CONT intercepting a positive response message of type "200 OK", or by the device $EGE_A$ accepting a delivery offer proposed in such a message "200 OK", is received by the communication interface INT of the connection device EC, the latter then undertakes (switching step 120) the connection of the transport cables dedicated to the electrical energy transport, by means of the switch COM. Here, insofar as the manager devices $EGE_B$ and $EGE_C$ have both responded positively with messages "200 OK", the switch COM connects the cables $Ie_A$, $Ie_B$ and $Ie_C$ together simultaneously as in FIG. 2 ($Ie_A,Ie_B$ and $Ie_A,Ie_C$) or successively (e.g. $Ie_A,Ie_B$ and then $Ie_A,Ie_C$).

Once this connection of electrical transport cables has been performed, the quantity of electrical energy negotiated can then be transported (step 130 of electrical energy transport) from the electrical energy supplier devices to the electrical energy demander device, by means of the cables dedicated to electrical energy transport. Here, 30 W of electrical energy are thus transmitted from installation B to installation A, via the cables $Ie_B$ and $Ie_A$, while 20 W of electrical energy are transmitted from installation C to installation A, via the cables $Ie_C$ and $Ie_A$, this electricity transport taking place between 19.// and 22.// as negotiated during the negotiation phase.

In case of simultaneous connection of the cables $Ie_A,Ie_B$ and $Ie_C$, the switch can be provided with a function which blocks the transfer of energy from $Ie_B$ to $Ie_C$ (or vice versa), so as to conserve all of the energy demanded by the demander installation A.

FIG. 3 is now referred to, and illustrates a system for negotiated delivery of electrical energy according to a second embodiment of the invention, in which a telecommunications network is used both for the negotiation of electrical resources between installations and for actual electrical energy delivery.

This system is distinguished from the previous in that the electrical energy negotiated between installations is transported through the telecommunications network NET. The cables $Ie_A$ to $Ie_C$ serving to transport the electricity are then traditional transmission lines (e.g. a copper pair) capable of supporting electric currents at electrical voltages of the order of 50 to 60 V. By way of example, this type of transmission line, implemented in the form of a copper pair with a diameter of 4/10 mm, is capable of supplying quantities of electricity of the order of 13 W, at a distance of 100 m, with an injected voltage of 60 V.

These transmission lines $Ie_A$ to $Ie_C$ are typically paired with the transmission lines $It_A$ to $It_C$ that are dedicated to the signaling, within so-called "multi-line" telecommunications cables $C_A$ to $C_C$, (for example, the cables of an xDSL local loop), linking each installation to the connection device EC in a one-to-one manner.

It may furthermore be appropriate to place one or more electrical storage batteries in the electrical systems $ELEC_A, \ldots, ELEC_C$ connected to these lines $Ie_A$ to $Ie_C$, so as to allow the delivery and the storage of the quantity of energy thus negotiated.

As the telecommunications network NET itself is employed for electricity transport, the connection device EC in which the switch COM is situated can then be the concentration point PC of a local telecommunications loop, a sub-distributor of the network NET, or indeed a distributor of the network NET, as a function of the number of subscribers to which the operator of the network NET desires to offer this decentralized electricity delivery service.

The device EC then comprises a separator element SEP to which the cables $C_A$ to $C_C$ are connected, making it possible to separate, on the one hand, the lines $It_A$ to $It_C$ and, on the other hand, the lines $Ie_A$ to $Ie_C$. The lines $It_A$ to $It_C$ are then connected, by a distributor element REP situated within the device EC, to a line It itself connected to the IMS network core of the network NET, so as to route the inter-installation signaling messages to the signaling control device CSCF. The lines $Ie_A$ to $Ie_C$ are, for their part, linked to the switch COM so as to be able to be connected together as described previously.

In FIG. 3, in contradistinction to FIG. 1, it is the connection device EC itself which intercepts the positive responses "200 OK" of the supplier installations and connects together the lines $Ie_A$ to $Ie_C$, as a function of these responses. In this respect, the device EC does not necessarily exhibit any communication interface INT but integrates the control module CONT directly, downstream of the distributor element REP with respect to the device CSCF, this module CONT intercepting the positive response messages "200 OK", issued by the electrical manager devices $EGE_B$ or $EGE_C$, and controlling the switch as a function of the content of these messages. Alternatively, the device EC can comprise a communication interface INT so as to receive a toggle request req_COM issued by the electrical manager device $EGE_A$ when it considers that a delivery offer is acceptable, similarly to what is described previously.

FIG. 4 is now referred to, and illustrates an alternative system for negotiated delivery of electrical energy according to the second embodiment of the invention in which a single network is used both for the negotiation of electrical resources between installations and for actual electrical energy delivery.

In this alternative system, the installations A to C are not linked to the connection device EC by a "multi-line" cable, but by a single transmission line (i.e. a "single-line" cable) which serves at one and the same time to transport the electricity and to transmit the negotiation messages.

Such a "multi-function" line can thus be a transmission line of a telecommunications network employing PoE ("Power on Ethernet") technology which uses a combiner filter ("injector") at the line input to superimpose the two types of signals (electrical and data transmission) on one and the same transmission line and a separator filter ("splitter") at the line output to separate these two signals. It is then the local loop of this telecommunications network which is suitable for transporting electricity.

Alternatively, this "multi-function" line can be an electrical transport cable of an electrical distribution network on which data are transmitted, for example by employing the line carrier coupling PLC ("Power Line Coupling") technology. It is then the local loop of the electrical distribution network which is suitable for managing all or part of the negotiation between installations.

Of course, the invention is not limited to the exemplary embodiments hereinabove described and represented, on the basis of which provision could be made for other modes and other embodiments, without however departing from the scope of the invention.

Thus, it will be understood that the signaling messages do not necessarily use the SIP protocol alone, but may also comply with some other signaling protocol such as the H.248 protocol, or indeed the OpenFlow protocol. Similarly, a telecommunications network with a network core of IMS type has been described, but other types of technologies, of Web type in particular, may be employed.

The invention claimed is:

1. A method of supplying electrical energy by means of a switching device connected to a plurality of installations by way of cables able to transport electrical energy, the method comprising:
   exchanging at least one negotiation message, formatted in accordance with a telecommunications signaling protocol, between an energy manager device, installed in one of said installations termed a demander, and at least one energy manager, installed in at least one other of said installations termed a supplier, wherein said negotiation message is a response message of said at least one supplier installation to an electricity supply request emanating from the demander installation;
   intercepting, in a control module, the response message;
   when the response message is positive, triggering the connection of one of said cables, connected to said demander installation, to at least one other of said cables, connected to said at least one supplier installation, by means of the switching device as a function of said at least one negotiation message; and
   transporting a quantity of electrical energy, from said at least one supplier installation to the demander installation, by way of the cables connected by means of the switching device.

2. The method as claimed in claim 1, in which the control module is situated in a telecommunications network, the method furthermore comprising, subsequent to the interception of the response message and when said response message is positive, the dispatching by the signaling control device of a switching request to the switching device so as to trigger the connection of the cables connected to the demander installation and the supplier installation.

3. The method as claimed in claim 1, in which the control module and the switching device are integrated into a connection device, the method furthermore comprising, subsequent to the interception of the response message and when said response message is positive, the control of the switching device by the control module as a function of the positive response message, so as to trigger the connection of the cables connected to the demander installation and the supplier installation.

4. The method as claimed in claim 1, in which the telecommunications signaling protocol is the SIP protocol.

5. A connection device able to be connected to a plurality of cables, respectively able to transport electrical energy to an installation, comprising a switch connected to said cables, said switch being configured to connect one of said cables, connected to a so-called demander installation, to at least one other of said cables, connected to at least one so-called supplier installation, as a function of a response message of said at least one supplier installation to an electricity supply request emanating from the demander installation, the response message being formatted in accordance with a telecommunications signaling protocol and exchanged between energy manager devices installed in said demander and supplier installations,
   wherein the switch is controlled by a control module able to intercept said response message, the switch being configured to connect one of said cables, connected to said demander installation, to at least one other of said cables, connected to said at least one supplier installation, as a function of said response message intercepted by the control module.

6. The connection device as claimed in claim 5, furthermore comprising a communication interface able to receive a switching request from the control module, the switching request being generated as a function of said response message, the communication interface being configured to control the switch as a function of said switching request so as to connect the cables connected to said demander and supplier installations.

7. The connection device as claimed in claim 5, furthermore comprising the control module, said control module being configured to control the switch as a function of the response message so as to connect the cables connected to said demander and supplier installations.

8. An electrical energy delivery system comprising:
a plurality of installations comprising an installation, termed a demander, and at least one other installation, termed a supplier, said demander and supplier installations each comprising an energy manager device, able to exchange at least one negotiation message formatted in accordance with a telecommunications signalling protocol, said at least one negotiation message comprising a response message of said at least one supplier installation to an electricity supply request emanating from the demander installation;
a connection device able to be connected to a plurality of cables, respectively able to transport electrical energy to one of said installations, comprising a switch connected to said cables, said switch being configured to connect one of said cables, connected to said demander installation, to at least one other of said cables, connected to said at least one supplier installation, as a function of said at least one response message;
wherein the switch is controlled by a control module able to intercept said response message, the switch being configured to trigger the connection of one of said cables, connected to said demander installation, to at least one other of said cables, connected to said at least one supplier installation, as function of the response message intercepted by the control module.

9. The electrical energy delivery system as claimed in claim 8, furthermore comprising a plurality of transmission lines respectively connecting the energy manager devices to a signaling control device configured to manage the exchange of signaling messages between said energy manager device.

10. The electrical energy delivery system as claimed in claim 9, in which said cables able to transport electrical energy are transmission lines paired in a telecommunications network with the transmission lines connecting the energy manager devices to the signaling control device.

11. The electrical energy delivery system as claimed in claim 8, in which said cables able to transport electrical energy are furthermore able to transmit said at least one negotiation message between the energy manager devices of said demander and supplier installations.

12. The electrical energy delivery system as claimed in claim 11, in which said cables, able to transport electrical energy and to transmit said at least one negotiation message, are transmission lines of a telecommunications network.

13. The electrical energy delivery system as claimed in claim 8, furthermore comprising a communication interface able to receive a switching request from the control module, the switching request being generated as a function of said response message, the communication interface being configured to control the switch as a function of said switching request so as to connect the cables connected to said demander and supplier installations.

14. The electrical energy delivery system as claimed in claim 8, furthermore comprising the control module, said control module being configured to control the switch as a function of the response message so as to connect the cables connected to said demander and supplier installations.

* * * * *